United States Patent [19]

Cazin

[11] Patent Number: 4,712,683
[45] Date of Patent: Dec. 15, 1987

[54] DISPLAY CARD OF PLASTIC MATERIAL WITH TWO ANTI-THEFT SYSTEMS

[75] Inventor: Pierre Cazin, St. Pierre les Nemours, France

[73] Assignee: Nestec, S.A., Vevey, Switzerland

[21] Appl. No.: 449,337

[22] Filed: Dec. 13, 1982

[51] Int. Cl.⁴ .............................................. B65D 73/00
[52] U.S. Cl. ............................ 206/478; 206/488; 206/490; 206/806
[58] Field of Search ............. 206/45.14, 477, 478, 206/479, 480, 481, 482, 483, 486, 487, 488, 489, 490, 495, 805, 806, 807, 388; 211/67, 69, 69.1, 89, 113, 115; 229/DIG. 8

[56] References Cited

U.S. PATENT DOCUMENTS

| | | | |
|---|---|---|---|
| 613,324 | 11/1898 | Selcer | 206/486 |
| 1,388,561 | 8/1921 | Grote | 206/482 |
| 1,477,241 | 12/1923 | Carson | 206/482 |
| 1,639,672 | 8/1927 | Schraysshuen | 206/486 |
| 1,690,853 | 11/1928 | Behrman | 229/DIG. 8 |
| 1,901,188 | 3/1933 | Phillips | 206/476 |
| 1,957,256 | 5/1934 | Frey | 206/45.14 |
| 2,201,921 | 5/1940 | Riley | 206/476 |
| 3,770,120 | 11/1973 | Hanson | 206/806 |
| 3,783,995 | 1/1974 | Tobin | 206/295 |
| 3,908,827 | 9/1975 | Bemmels et al. | 206/488 |
| 3,978,984 | 9/1976 | Cowley | 206/481 |
| 4,311,236 | 1/1982 | Johnson | 206/488 |

FOREIGN PATENT DOCUMENTS

| | | | |
|---|---|---|---|
| 2520696 | 11/1976 | Fed. Rep. of Germany | 206/45.14 |
| 0658784 | of 1929 | France | 206/486 |
| 0731117 | 8/1932 | France | 206/487 |
| 0493323 | 10/1938 | United Kingdom | 206/487 |
| 0819965 | 9/1959 | United Kingdom | 206/486 |

Primary Examiner—Jimmy G. Foster

[57] ABSTRACT

The present invention deals with a new display card of plastic material, which is particularly usable in the packaging of collars and leashes for cats or dogs, distinguished in that the display card includes:

a device, preferably on the side of the card, for hanging the card on the bar of a display unit;

a first longitudinal anti-theft device comprising an elongated strap, one end of which is hingedly secured to the card, and the other end of which includes a series of ratchet teeth adapted to be inserted through and secured in a slot in the card;

a second anti-theft device similar to the first, preferably arranged in a direction perpendicular to that of the first device; and optionally, a notch formed in the bottom edge of the card and at least one opening in the card adjacent to the notch for winding up therein objects of a certain length.

6 Claims, 2 Drawing Figures

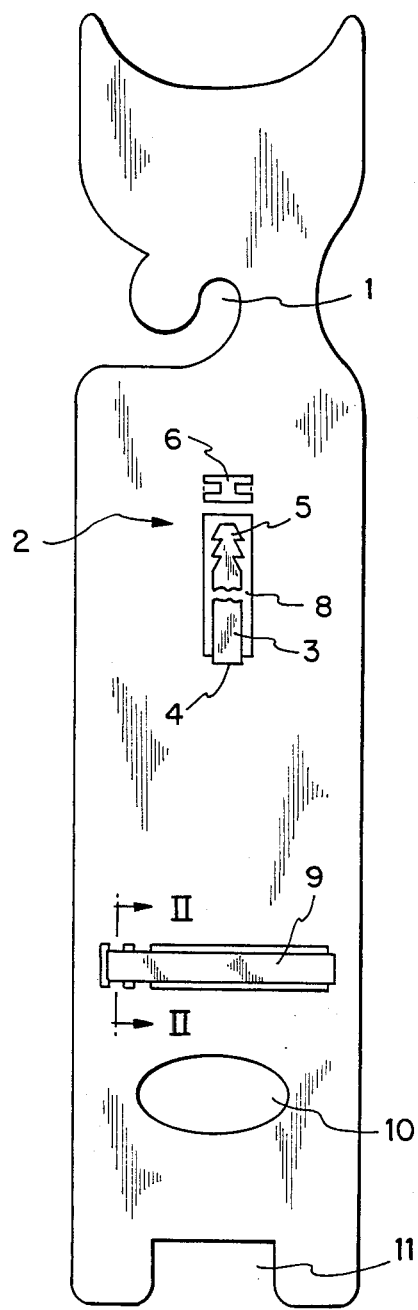
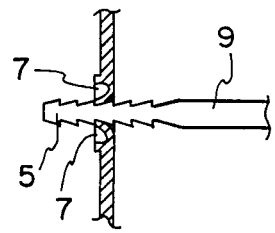
FIG. 1
FIG. 2

DISPLAY CARD OF PLASTIC MATERIAL WITH TWO ANTI-THEFT SYSTEMS

The present invention relates to a display card of plastic material having two anti-theft systems.

Numerous retail sales outlets, particularly supermarkets, wish more and more to arrange the articles for sale on display stands on which are hung "cards" carrying the articles to be sold.

Morever, such retail sales outlets wish to see to it that the articles displayed are capable of being touched by the potential buyers without, however, being able to be removed too easily from the display card.

Such cards for displaying an article must therefore be designed to take into account, on the one hand, the need to permit the customer to examine, touch and feel the article displayed, and on the other hand, the need to prevent the theft of such article from the card.

The present invention provides a display card which is particularly well suited for carrying collars and leashes for dogs and cats.

Such articles, that is, collars and leashes for animals, typically have at least one buckle or ring associated with the article, with such buckle or ring being used advantageously to prevent any theft of said object from the display card of this invention.

The display card of the present invention preferably is formed of suitable plastic material and is characterized in that it compresses a flat sheet, elongated in shape, for example, rectangular, which, when hung on a display stand, includes from top to bottom:

a means for hanging the display card on the bar of a display unit;

a first longitudinal anti-theft device comprising an elongated strap integrally formed with the card, with one end of the strap being hingedly secured to the card, and the opposing end of the strap having a series of ratchet teeth which are adapted to be inserted through and secured in a slot in the card adjacent the free end of the strap;

a second anti-theft device arranged below the first and at a certain distance from the latter, having the same make-up as the first anti-theft device, but preferably arranged perpendicular to that first device;

and, preferably, an opening in the card adjacent the bottom edge of the card, and a notch formed in the bottom edge of the card which makes it possible more easily to arrange the leashes that have a certain length.

The invention will be more easily understood by referring to the non-limiting example below, which is illustrated by the diagrammatic FIGS. 1 and 2.

FIG. 1 is the front view of a display card according to the invention for holding an animal collar or leash.

FIG. 2 is a view across II—II of FIG. 1 of the anti-theft system used.

In FIG. 1 are represented:

at 1 the hook-like opening formed in the card, permitting side hanging of the card on a suitable support;

at 2 the first anti-theft device. This device is made up of an elongated strap 3, integrally formed with the card, that can pivot around a thinned-down part 4 located at the level of joining one end of said strap to the surface of the card, with the opposing end 5 of the strap having a series of ratchet teeth; the card has a slot 6 adjacent the free end of the strap, whose side edges may be provided with flexible tabs 7 arranged so that the ratchet teeth of the strap goes ratcheting into said flexible parts, as is represented in FIG. 2 to thereby secure the strap in position and prevent removal of the strap; on the card depicted there is an opening 8 beneath strap 2; this opening results from the process used to make the elongated strap;

at 9 an anti-theft device completely analogous to the first anti-theft device; it will be noted that this device is perpendicularly disposed with respect to the first device, which extends in the vertical direction when the card is hung up by 1;

at 10 an opening in the card and at 11 a notch in the bottom edge of the card so that long objects, such as dog leashes, may be wound up on the card without extending beyond the card edge. Thus, the opening 10 and notch 11 are sized to permit the leash to freely pass from the front surface of the card, through opening 10 to the back of the card and around notch 11 to the front surface of the card.

It is important to note that the elongated anti-theft straps are so sized that the straps may be inserted through a buckle or ring associated with the collar or leash to be displayed on the card before ratcheting the free end of the strap in slot 6, to thereby securely retain the collar or leash on the card.

The advantages of the display card of the invention are basically the following:

securing the displayed article against theft, the packaged article may be touched by customers, adaptability of the card to any article, especially articles that are long in shape and contain a buckle or ring permitting at least one anti-theft strap to be inserted through the buckle or ring, possibility for certain objects that they may use the two anti-theft devices.

What is claimed is:

1. A display card of plastic material, usable in particular for elongated articles such as collars and leashes for cats or dogs, distinguished in that in includes:

a device, preferably lateral, for hanging the card on a bar of a display unit;

a first longitudinal anti-theft device comprising an elongated strap of plastic material with one of the ends of the strap being hingedly secured to the card, and the free end of the strap having a plurality of ratchet teeth which are adapted to be inserted through and secured in a slot in the card adjacent the free end of the strap;

a second anti-theft device similar to the first, disposed in a direction perpendicular to that of the first device;

and a notch in the bottom edge of the card, with the card having an opening adjacent said notch, said opening and said notch being sized to permit the article to pass from the front surface of the card, through said opening to the back of the card and around said notch to the front surface of the card.

2. A display card for elongated articles such as collars and leashes for cats or dogs which comprises a flat planar card member, hanger means in the card, a first elongated strap for securing the article on the card, said first strap being adjacent said hanger means and having one end formed integral with the display card and a free end which is provided with a plurality of ratchet teeth, the card having a first slot adjacent said free end of the first strap, with the free end of said first strap being adapted to be inserted through and secured in said first slot, a second elongated strap for securing the article on the card, said second strap being intermediate the first strap and the bottom edge of the card and disposed in a direction perpendicular to said first strap, said second strap having one end formed integral with the display card and a free end which is provided with a plurality of ratchet teeth, the card having a second slot adjacent said free end of the second strap, with the free end of said second strap being adapted to be inserted through and secured in said second slot, and a notch in the bottom edge of the display card, with the card having an opening therethrough intermediate said second strap and said notch, said opening and said notch being sized to permit the article to pass from the front surface of the card, through said opening to the back of the card and around said notch to the front surface of the card.

3. The display card defined in claim 2 in which the notch is larger than the cross-sectional dimension of the article to be mounted on the card whereby the article may be wound up on the card without extending substantially beyond the bottom edge of the card.

4. The display card defined in claim 2 in which the card is substantially rectangular in shape and the first elongated strap is disposed along the longitudinal center line of the card.

5. The display card defined in claim 2 in which the side edges of both said first slot and second slot are provided with integral flexible tabs adapted to secure the ratchet teeth of said straps.

6. The display card defined in claim 2 in which said hanger means comprises a hook-like indentation in the side edge portion of the card adjacent the upper end of the card.

* * * * *